United States Patent Office 3,746,667
Patented July 17, 1973

3,746,667
CATALYTIC PROCESS FOR PREPARING FOAM FROM A NITRILE CARBONATE AND A NUCLEOPHILIC COMPOUND
Jerry A. Dieter, Huntington Woods, Mich., Larry G. Wolgemuth, Cherry Hill, N.J., and Thomas J. Ryan, Yeadon, Pa., assignors to Atlantic Richfield Company, New York, N.Y.
No Drawing. Filed Sept. 21, 1971, Ser. No. 182,529
Int. Cl. C08g 22/44
U.S. Cl. 260—2.5 A        11 Claims

ABSTRACT OF THE DISCLOSURE

A catalyst system for preparing a foam from a cyclic nitrile carbonate and a polyol or a polythiol is provided from a multi-component catalyst system comprising an aluminum-containing compound, a tin-containing compound and a third compoent selected from alkali metal-containing compounds and tertiary organic amines.

BACKGROUND OF THE INVENTION

U.S. Pat. 3,531,425 describes the preparation of a novel class of urethane-type materials obtained by reacting various nitrile carbonates, sulfites or oxalates with nucleophilic compounds such as polyols. This condensing-rearranging reaction may produce foam in the absence of an extraneous foaming or blowing agent since the cyclic nitrile adduct reactants contain their own internal blowing agent in the carbon dioxide gas evolved during reaction with the nucleophilic compounds. A variety of tertiary amine catalysts are disclosed as suitable for preparation of these polyurethanes.

U.S. Pat. 3,652,507 also describes preparation of similar type polyurethanes wherein the reaction is catalyzed with a catalyst combination of a first metal from Group III through IV of the Periodic Chart such as tin or aluminum and a second metal selected from metals of Groups I and II and the iron series of Group VIII of the Periodic Chart. In U.S. Pat. 3,702,320 it is disclosed that certain metals such as tin, titanium, zinc, bismuth, aluminum and iron are particularly effective catalysts when these metals are used alone rather than in combination with other metals.

SUMMARY OF THE INVENTION

This invention relates to a multi-component catalyst system for preparing foamed products from the condensing-rearranging reaction of a nucleophilic organic compound with a cyclic nitrile carbonate. It is an object of this invention to provide an improved method of preparing good quality foamed products from the aforementioned reactants. It is another object of this invention to prepare foamed products having a rapid reaction time, an easily controllable reaction, and good physical properties. It is a specific object of this invention to prepare foamed products wherein the surface of the foamed article is cured, dry and free from tackiness.

These and other objects of the invention are accomplished by reacting a nucleophilic organic compound having at least 2 hydroxyl or thiol radicals with a cyclic nitrile carbonate in the presence of a multi-component catalyst system comprising an aluminum-containing compound, a tin-containing compound and a component selected from alkali metal-containing compounds or tertiary organic amines.

DESCRIPTION OF THE INVENTION

The cyclic nitrile adducts useful in this invention may be represented by the structure:

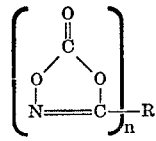

wherein R is an organic radical having from 2 to about 200,000 carbon atoms and is free of reactive hydrogens as determined by the Zerewitinoff test and $n$ ranges from about 2 to about 100,000 or more. Generally, R will consist essentially of carbon and hydrogen but there can be included therein other elements as well, so long as they do not materially affect the radical's basic characteristic of being non-interferring in the condensation-rearranging reaction of the cyclic nitrile carbonate group with the hydroxyl or thiol group. Examples of non-interferring groups which can be present in R and which contain elements other than carbon and hydrogen are alkoxy, nitro, and halo groups. R can be aliphatic or aromatic, including cycloaliphatic, alkaryl, or aralkyl radicals.

The preparation of the low molecular weight aliphatic and aromtic cyclic nitrile adducts wherein $n$ ranges up to 4 has been described in detail in U.S. Pats. 3,531,425, and 3,652,507, both incorporated herein by reference. A preferred example of this class of carbonates for use in this invention is adipodinitrile carbonate which has the structure:

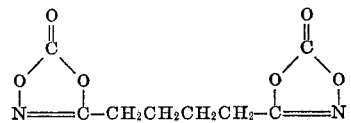

The higher molecular weight adducts, wherein $n$ is 5 or higher, can be prepared by the homopolymerization of the vinyl derivatives of the cyclic nitriles, for example, vinyl nitrile carbonate having the structure:

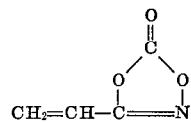

or the above described analogues.

Likewise these vinyl compounds can be copolymerized with one or more polymerizable monomers, for example, olefinically unsaturated hydrocarbons, esters, ethers, aldehydes, ketones, nitriles, amides, halogen compounds, carboxylic acid or anhydride compounds and like monomers which are not nucleophilic compounds, i.e. those free of reactive hydrogen atoms as determined by the Zerewitinoff test, or free of positive metal ions or a positive ammonium ion which would react with the cyclic nitrile group. Examples are the mono- and diolefins such as ethylene, propylene, butadiene, styrene, vinyl ethers, vinyl esters, the acrylates, methacrylates, acrylonitrile, vinyl chloride, maleic anhydride and the like. The production of these high molecular polycyclic nitrile adducts is likewise disclosed in U.S. Pats. 3,480,595 and 3,652,507 both of which are incorporated herein by reference. The polymerization to prepare the cyclic nitrile carbonates can be catalyzed by conventional polymerization catalysts, particularly of the free-radical type such as the peroxide type compounds, e.g. benzoyl peroxide, the azo compounds, ultra-violet light, and beta or gamma irradiation.

The nucleophilic organic compounds may be polyols or polythiols having active hydrogen atoms bonded to oxygen or sulfur which can be reacted with the cyclic nitrile carbonates. Preferred nucleophilic compounds are any of the polyhydroxy compounds that react with isocyanates to yield polyurethanes.

Useful nucleophilic compounds include such polyols or polythiols as aliphatic, aromatic, or polyester, polyether and polylactones, and similar compounds having from 2 to 6 or more, but preferably 3 or more, —OH or —SH groups per molecule and having molecular weights ranging from 62 for ethylene glycol to 75,000 or higher with hydroxyl numbers ranging from 12 to 1100 or more. Mixtures of two or more of these compounds can also be employed.

The aliphatic and aromatic polyhydric alcohols and thiols include, for example, ethylene glycol, diethylene glycol, thiodiethylene glycol, propylene glycol, 1,3-butylene glycol, 1,6-hexanediol, butenediol, butynediol, amylene glycols, 2-methylpentanediol - 2,4, 1,7 - heptanediol, glycerine, neopentyl glycol, trimethylol propane, triethanol amine, pentaerythritol, cyclohexane dimethanol, sorbitol, mannitol, glactitol, talitol, xylitol, 1,2,5,6-tetrahydroxyhexane, styrene glycol, bis(ξ-hydroxyethyl)diphenyldimethylmethane, silanediols, e.g. triphenyl silanols, 1,4-dihydroxybenzene and the thiol analogues thereof.

The active hydrogen-containing nucleophilic polymeric compounds useful in this invention include, for instance, polyhydric polyalkylene ethers, hydroxyl polyesters, hydroxyl group containing, preferably hydroxyl-group terminated, polymers, and the thiol analogues thereof. The polyhydric polyalkylene ethers may have a molecular weight greater than about 750 and a hydroxyl number of from about 40 to 150 and may be derived, for example, by the polymerization of alkylene oxides such as ethylene oxide, propylene oxide, butylene oxide and the like. Polyhydric polyalkylene ethers may also be prepared by the polymerization of the cyclic ethers such as, for example, dioxane, tetrahydrofuran and the like, and by the condensation of an alkylene oxide with a glycol such as ethylene glycol, propylene glycol, butylene glycol and the like.

The hydroxy-containing polyesters may be obtained by the reaction of aliphatic or aromatic dicarboxylic acids with aliphatic or aromatic polyhydric alcohols in the manner well known to the art in proportions that result in esters having at least two reactive hydroxy groups. Any polyhydic alcohols or thiols may be used to form the hydroxy or thiol esters and illustrative of such alcohols are those listed above in the discussion of suitable alcohols as the active hydrogen-containing reactant. Included within the suitable esters are the diglycerides, and hydroxyl-containing castor oil, tall oil, soya oil, linseed oil, etc. The latter esters are usually prepolymers prepared by the reaction of the fatty glyceride with low molecular weight polyols. Illustrative, for instance, of castor oil-based prepolymers are: propylene glycol monoricinoleate, propylene glycol mono-12-hydroxystearate, neopentyl glycol monoricinoleate, dehydrated castor oil, ethylene glycol monoricinoleate, ethylene glycol mono-12-hydroxystearate, triglyceride or ricinoleic acid, epoxidized castor oil, and pentaerythritol tetraricinoleate. Other suitable polymeric compounds include the hydroxyl- or thiol-terminated olefin polymers such as those of 1,4-butadiene, isoprene, 2,3-dimethylbutadiene, 2-chloro-1,3-butadiene, 2-cyano-1,3-butadiene, and other polymerizable, ethylenically unsaturated monomers such as α-olefins of up to 12 carbon atoms such as ethylene, propylene, butene, etc.; styrene, acrylonitrile, acrylic acid or ester, methacrylic acid or ester, vinyl chloride, vinylidene chloride and the like; hydroxyl-terminated condensates of phenol and lower aldehydes and hydroxy-terminated polyepoxides.

In accordance with the present invention, it is desired to produce foamed or cellular products by the reaction of the cyclic nitrile carbonate with the nucleophilic compound. The relative proportions of the nucleophilic polyol or polythiol and cyclic nitrile carbonate that are employed in the process of the present invention can vary, however, the reactants should generally be used in a proportion which provides a ratio of cyclic nitrile carbonate groups to hydroxyl groups of about 0.7 to 10:1. To obtain relatively high molecular weight products a ratio of approximately 1 should be used. If mixtures of different nucleophilic compounds are used in the reaction, this may be employed in any desired mole ratio.

The reaction is conducted in the presence of a multicomponent catalyst system comprising an aluminum-containing compound, a tin-containing compound and either an alkali metal-containing compound or a tertiary organic amine. The metal-containing compounds used in the catalyst system must be sufficiently soluble in the reaction mixture, and preferably soluble in the polyol or polythiol reactant, to provide catalytically-effective amounts of the compound in solution in the reaction zone. The aluminum-containing compound and tin-containing compound may be any of the oxides, hydroxides, halides (preferably chlorides), alcoholates, chelates, and carboxylic acid salts of aluminum and tin. Suitable alcoholates include, for example, the alkoxides, aryloxides, aralkoxides, and alkaryloxides. Suitable chelates include, for example, those formed from beta-diketones, e.g., the acetylacetonates. Suitable carboxylic acid salts include, for example, the fatty acid salts such as the laurates.

Although the valence state of the aluminum-containing compound and tin-containing compound may be any state other than zero, generally the aluminum compound is trivalent and the tin compound is either divalent or tetravalent.

The aluminum-containing compound will usually be employed in an amount to provide at least about 0.05% of aluminum-containing compound by weight, based on the weight of the nucleophilic compound, and the amount of tin-containing compound will be at least about 0.3% by weight, based on the weight of the nucleophilic compound.

Preferred aluminum-containing compounds include any of the aluminum alkoxides, aluminum alkyls or aluminum halides, as well as bimetallic compounds containing aluminum and an alkali metal. Representative compounds include aluminum chloride, trimethylaluminum, triisobutylaluminum, aluminum isopropoxide, tertiarybutylaluminum alkoxide, and bimetallic compounds such as sodium aluminum hydride.

The tin-containing compounds generally are organo-tin compounds such as stannous acylates, i.e., stannous acetate, stannous octoate, and stannous laurate; stannous alkoxides and phenoxides such as stannous butoxide, stannous 2-ethylhexoxide and stannous phenoxide; dialkyl tin salts of carboxylic acids such as dibutyltin diacetate, dibutyltin dilaurate, dilauryltin diacetate, and dioctyltin diacetate. Additionally, there can be used a trialkyltin hydroxide, dialkyltin oxide, or a dialkyltin chloride tributyltin hydroxide, trioctyltin hydroxide, dibutyltin oxide, dioctyltin oxide, dilauryltin oxide, dibutyltin dichloride and dioctyltin dichloride.

The third component of the catalyst system is either an alkali-metal-containing compound such as sodium or potassium compounds or a tertiary organic amine. Examples of alkali-metal-containing compounds are the alkali-metal hydroxides, alkoxides and phenoxides. Such compounds as sodium hydroxide, potassium hydroxide, sodium n-butoxide, sodium t-butoxide and other sodium alkoxides formed from any of the lower alkanols are suitable. Generally, the amount of alkali-metal-containing compound will be at least about 0.02% by weight based on the weight of the nucleophilic compound. Another class of compounds are previously mentioned bimetallic compounds containing both aluminum and an alkali metal. Representative of this class of compounds are alkali-metal aluminum hydrides such as sodium aluminum hydride, lithium aluminum hydride and potassium aluminum hydride.

Tertiary organic amines useful in the catalyst system include both aromatic and aliphatic tertiary amines such as pyridine, dimethyl aniline, triethylamine, trimethylamine, tri-n-propylamine, tri-n-butylamine, triethylenediamine, N-methyl-piperidine, N-allyl-piperidine and the like. The amount of tertiary amine employed in the catalyst system generally may be 0.3% or more by weight, based on the weight of the nucleophilic compound.

Any of the aluminum-containing compounds, tin-containing compounds, alkali-metal-containing compounds, and tertiary organic amines disclosed in U.S. Pat. 3,531,425, 3,652,507 and 3,702,320 as catalysts for condensing a cyclic nitrile carbonate with either a polyol or a polythiol may be used as components of the present catalyst system. The reaction temperature for the process of the present invention is in the range of from about 50° C. to about 125° C., and preferably from about 80° C. to about 110° C. Reaction times will vary and will be dependent to some extent on the nature of the desired product. Usually the foaming reaction will be completed in about 1 to 10 minutes or more and more often in about 2 to 7 minutes. Subatmospheric, atmospheric and superatmospheric pressures can be used.

In a preferred method of using the process of the present invention, the polyol or polythiol reactant is degassed prior to being admixed with either the catalyst or the cyclic nitrile carbonate. The purpose of the degassing is to remove water and molecular oxygen from the system. Water might serve to react with the dilute the effect of some of the catalysts which can be used in the present process; also, it can react with the cyclic nitrile carbonate reactant under certain conditions. Some hydroxyl group and thiol group containing compounds are sensitive to molecular oxygen at the reaction temperatures. Thus the reason for preferring, under appropriate circumstances, to purge moisture and oxygen from the hydroxyl or thiol group-containing reactant.

In the production of foams by the process of the invention it is not necessary to employ an extraneous foaming or blowing agent since the cyclic nitrile carbonate reactants contain their own internal or "built in" blowing agent, namely the carbon dioxide gas that they evolve during reaction with the hydroxyl group-containing compounds. Conventional foaming agents, however, may be employed if desired; among those which are suitable may be listed: low boiling solvents such as benzene, toluene, acetone, pentane, hexane, ethyl ether, butyl acetate, and the like; halogenated hydrocarbons such as methylene dichloride, carbon tetrachloride and particularly fluorinated hydrocarbons such as trichloromonofluoromethane, dichlorodifluoromethane, monochlorotrifluoromethane and the like, as well as agents which will decompose to evolve an inert gas as, for instance, ammonium carbonate, sodium bicarbonate, N,N'-dimethyl-N,N'-dinitrosoterephthalamide, para,para'-oxybis(benzene-sulfonic acid), azodicarbonamide, benzene sulfonyl hydrazide, azodiisobutyronitrile, para-tertiary butyl benzoylazide and the like.

Formation of foams can follow the well established practice of the art, except that the conditions of the reaction between the cyclic nitrile carbonate compound and polyol should be controlled to effect the reaction at a rate slow enough to preclude escape of the evolved $CO_2$ gas before there has been gelation of the reaction mixture to the extent sufficient to entrap the evolved gas and form a cellular, polyurethane product.

When preparing foamed polyurethane by the method of the present invention it is generally preferred to employ at least a trifunctional reactant, which can be either the cyclic nitrile carbonate, the hydroxyl or thiol group-containing compound, or both. Thus, for example, excellent polyurethane foams can be prepared by condensing-rearranging a difunctional cyclic nitrile carbonate with a thiol to yield a crosslinked product.

If desired, surface active agents may be used, for instance in concentrations of about 0.1 to 10% by weight of the reactants, to stabilize the foam. Generally useful are silicone emulsifiers and non-ionic surface active agents such as condensates of ethylene oxide with vegetable oils, alcohols, or organic acids. The siloxanes employed as a foam stabilizer in the foam formulations of this invention are well known and frequently employed stabilizers in polyurethane-type foams. Suitable siloxane or silicone oil emulsifiers are described in U.S. Pat. 2,834,748 and 2,917,480. Silicone oils preferred are polydimethyl siloxanes or an alkyl silane polyoxyalkylene block copolymer. Most preferred is a compound of the structure

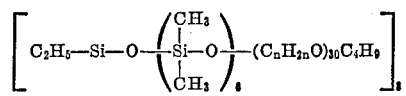

wherein $(C_nH_{2n}O)$ is a mixed polyoxyethylene and oxypropylene block copolymer containing about 17 oxyethylene units and about 13 oxypropylene units.

In accordance with conventional practice, inert organic or organic fillers, as well as other additives, may be incorporated into the formulation. Such other additives include plasticicizers such as dioctyl phthalate and di(2-ethylhexyl)adipate, extenders, softeners, coloring agents and emulsifiers.

The foamed products of this invention have many and varied uses as, for example, in the preparation of cushions, automotive parts such as head rests, arm rests, crash pads, as well as insulation and the like.

According to the invention, foaming of the cyclic nitrile reactant and the nucleophilic compounds reactant is conducted in the presence of the aforementioned multicomponent catalyst system and this catalyst system enables the production of a flexible foam in a short reaction time. Of particular importance is the fact that the surface of the foam appears fully cured and is free from tackiness and non-sticky as determined by finger touch.

The following examples are provided to further illustrate the invention and the reactants and their proportions are presented as being typical of various modifications that can be made in view of the foregoing disclosure. Unless otherwise specified, all parts and percentages disclosed in the examples are by weight.

EXAMPLE I

To a 100 ml. resin Rettle equipped with a mechanical stirrer was added 30 g. of a polypropylene ether triol having a molecular weight of 3,000 and a hydroxyl number of 57.7. This polyol was degassed for one hour at 15 mm. Hg pressure at 115° C. An amount of sodium aluminum hydride equivalent to 0.3% of the weight of the polyol was dissolved in an excess of absolute ethyl alcohol and added to the degassed polyol. The excess alcohol was removed on a rotary evaporator after which the mixture was again degassed at 100° C. for 30 minutes at 15 mm. Hg pressure. Thereafter, 0.3 g. of dibutyltin dilaurate, 0.2 g. of a silicone oil (a polysiloxane polyoxyalkylene glycol polymer prepared in accordance with the disclosure in U.S. Pat. 2,834,748) and 3.9 g. butane 1,4-di(nitrile carbonate) were charged to the reaction vessel and allowed to heat for three minutes at 90° C. in an oil bath. The mixture was stirred with the high speed stirrer for 30 seconds and transferred to another reaction vessel immersed in an oil bath at 100–110° C. The mixture of ingredients immediately began to foam and after completion of foaming, the foamed product is heated an additional 10 to 30 minutes. Thereafter, the exposed surface of the foam was heated with an infrared lamp. Evaluation of the foam indicated excellent physical properties and the surface of the foam was observed to be completely cured and tack-free. Tackiness was determined by finger touch.

EXAMPLE II

The same reactants and procedures of Example I were repeated with the exception that the concentration of dibutyltin dilaurate was reduced to 0.67%. Again, a very rapid reaction occurred producing a foam having good body and fine cell structure and the surface of the foam was observed to be completely cured and free of tackiness.

EXAMPLE III

The procedure of Example I was again repeated with the exception that the concentration of the sodium aluminum hydride catalyst was reduced to 0.2% but otherwise all conditions remained the same. The reaction proceeded rapidly and produced a foam having good body and cell structure as well as a surface free of tackiness as determined by finger touch.

EXAMPLE IV

The procedure of Example III was repeated with the exception that the concentration of sodium aluminum hydride catalyst was further reduced to 0.15%. Again, a very good reaction was observed that produced a foam having fine cell structure and no surface tackiness.

EXAMPLE V

The same procedure of Example IV was repeated but the amount of sodium aluminum hydride was even further reduced to 0.075%. A good reaction proceeded and no surface tackiness was observed.

EXAMPLE VI

In this example the catalyst components were triisobutylaluminum, dibutyltin dilaurate and triethylene diamine. Dry benzene in an amount of 100 cc. was added to 22 ml. of a 25% solution of triisobutylaluminum in benzene. This solution was slowly added to 500 g. of the same degassed polyol employed in Example I and this addition was carried out under nitrogen with rapid stirring. After the addition was complete the mixture was heated for an hour at 80° C. and thereafter the benzene was removed under reduced pressure. The resulting mixture was then heated for an additional hour at 100° C. and 15 mm. of Hg.

To a 100 ml. resin kettle equipped with a mechanical stirrer was added 30.0 g. of the aforementioned catalyzed polyol containing 1.1% by weight of triisobutylaluminum. Also charged to the resin kettle were 0.3 g. of dibutyltin dilaurate, 0.3 g. of triethylene diamine, 0.2 g. of the silicone oil of Example I and 3.9 g. of the nitrile carbonate used in Example I. These ingredients were allowed to heat for four minutes at 90° C. in an oil bath and thereafter the mixture was transferred to another container for foaming following the procedure of Example I. The foam was evaluated and considered to have good physical properties and the surface was cured and free from tackiness.

EXAMPLE VII

The procedure of Example VI was repeated except that the aluminum component of the catalyst was aluminum isopropoxide in an amount of 1.13% based on the weight of the polyol. A similar foam was obtained having good cell structure and no surface tackiness.

EXAMPLE VIII

Example I was repeated with the exception that the sodium aluminum hydride catalyst component was replaced with 1.1% of triisobutyl aluminum and 0.53% sodium t-butoxide wherein the percentages are based on the weight of the polyol. The foam reaction produced a product having good properties and a tack free surface.

Although the invention was described in substantial detail, it should be understood that such detail is provided for purposes of illustration and that many variations may be used by those skilled in the art without departing from the scope of the invention.

We claim:
1. In a process for producing foamed material comprising condensing (A) a nucleophilic organic compound having at least two reactive hydrogen-containing radicals selected from the group consisting of hydroxyl radicals and thiol radicals with (B) a cyclic nitrile carbonate by contacting (A) and (B) at an elevated temperature in the presence of a catalyst, the improvement wherein the catalyst is a multi-component catalyst system comprising:
   (I) An aluminum-containing compound and
   (II) A tin-containing compound and
   (III) A component selected from the group consisting of alkali-metal-containing compounds or tertiary organic amines.
the metal-containing compounds of I, II, and III being sufficiently soluble in the reaction mixture to provide catalytically-effective amounts of the components in solution in the reaction zone.

2. A process according to claim 1 wherein (B) is a cyclic nitrile carbonate having the structure:

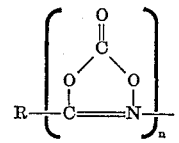

wherein R is an organic radical having from 2 to about 200,000 carbon atoms and is free of reactive hydrogens, as determined by the Zerewitinoff test and wherein $n$ is at least 2.

3. A process according to claim 1 wherein (A) is a nucleophilic organic compound having at least 2 hydroxyl radicals.

4. A process according to claim 3 wherein $n$ in the structure of the cyclic nitrile carbonate is 2 to 4.

5. A process according to claim 4 wherein the hydroxyl radical containing compound is a poly(alkylene ether) glycol.

6. A process according to claim 5 wherein $n$ in the structure of cyclic nitrile carbonate is 2.

7. A process according to claim 6 wherein the cyclic nitrile carbonate is adipodinitrile carbonate.

8. A process according to claim 7 wherein catalyst component (I) is an aluminum-containing compound.

9. A process according to claim 1 wherein the amount of catalyst component (I) is at least about 0.05% by weight, the amount of (II) is at least about 0.3% by weight, and the amount of (III) is at least about 0.02% when (III) is an alkali metal and at least about 0.3% when (III) is an amine, said weights being based on the weight of (A).

10. A process according to claim 1 wherein said multi-component catalyst system comprises
   (a) a bimetallic compound containing both aluminum and an alkali metl and
   (b) a tin-containing compound.

11. A process according to claim 10 wherein said bimetallic compound is sodium aluminum hydride.

References Cited
UNITED STATES PATENTS
3,652,507  3/1972  Burk ............ 260—77.5 B
3,531,425  9/1970  Burk ............ 260—37 N DONALD E. CZAJA, Primary Examiner C. WARREN IVY, Assistant Examiner U.S. Cl. X.R.

260—2.5 AB, 2.5 AC, 77.5 B

PO-1050
(5/69)

UNITED STATES PATENT OFFICE
CERTIFICATE OF CORRECTION

Patent No. 3,746,667          Dated July 17, 1973

Inventor(s) J. A. Dieter, L. G. Wolgemuth, and T. J. Ryan

It is certified that error appears in the above-identified patent and that said Letters Patent are hereby corrected as shown below:

Claim 2 - the formula should read as follows:

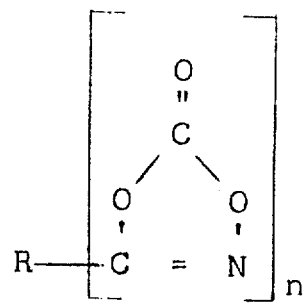

Claim 10, line 4, "metl" should read --metal--.

Signed and sealed this 27th day of November 1973.

(SEAL)
Attest:

EDWARD M. FLETCHER, JR.　　　　　　RENE D. TEGTMEYER
Attesting Officer　　　　　　　　　　Acting Commissioner of Patents